United States Patent

Hara et al.

Patent Number: 5,391,674
Date of Patent: Feb. 21, 1995

[54] PROCESS FOR PRODUCING BRANCHED ORGANOPOLYSILOXANE

[75] Inventors: Hiroyasu Hara, Annaka; Masayuki Ikeno, Maebashi; Akihito Tsukuno, Annaka, all of Japan

[73] Assignee: Shin-Etsu Chemical Co., Ltd., Tokyo, Japan

[21] Appl. No.: 197,872

[22] Filed: Feb. 17, 1994

[30] Foreign Application Priority Data

Feb. 17, 1993 [JP] Japan ................................. 5-051417

[51] Int. Cl.$^6$ .............................................. C08G 77/06
[52] U.S. Cl. ...................................... 528/14; 528/21; 528/23; 528/34
[58] Field of Search ........................ 528/34, 14, 21, 23

[56] References Cited

U.S. PATENT DOCUMENTS

| | | | |
|---|---|---|---|
| 2,909,549 | 10/1959 | Bailey | 528/34 |
| 4,923,755 | 5/1990 | Witucki | 525/477 |
| 4,929,691 | 5/1990 | Fillmore et al. | 528/23 |
| 4,929,703 | 5/1990 | Narula et al. | 528/232 |

Primary Examiner—Melvyn I. Marquis
Attorney, Agent, or Firm—Oblon, Spivak, McClelland, Maier & Neustadt

[57] ABSTRACT

A process for producing a branched organopolysiloxane, comprising the steps of subjecting mixture of (A) a trialkoxysilane having the general formula (1):

$$R^1Si(OR^2)_3 \quad (1)$$

wherein $R^1$ is a hydrocarbon group, and $R^2$ are each a hydrocarbon group, and (B) an organosiloxane oligomer obtained by hydrolysis-condensation of a silane compound having the general formula (2):

$$R^3{}_aSiCl_{4-a} \quad (2)$$

wherein $R^3$ are each a hydrocarbon group and a is 2 or 3, to equilibration reaction in the presence of an alkali catalyst, and adding water, subsequently to or concurrently with the equilibration reaction, to the reaction mixture, thereby hydrolyzing the Si—$OR^2$ groups contained in the organopolysiloxane resulting from the hydrolysis-condensation. A branched organopolysiloxane stable in molecular composition and properties such as viscosity, can be produced.

9 Claims, No Drawings

PROCESS FOR PRODUCING BRANCHED ORGANOPOLYSILOXANE

BACKGROUND OF THE INVENTION

1. Field of the Invention

The present invention relates to a process for producing a branched organopolysiloxane, which can be advantageously realized economically and industrially.

2. Description of the Prior Art

As a process for producing a branched organopolysiloxane, it is known to obtain a branched organopolysiloxane, for example, by heating and, mixing a mixture containing an $R_3SiO_{0.5}$ unit (hereinafter referred to as an M unit) and an $R_2SiO$ unit (hereinafter referred to as a D unit), wherein R are each an organic group bonded to the silicon atom, in the presence of a potassium silanolate to effect equilibration reaction, and subsequently by slowly adding a hydrolysis product of a silane compound containing an M unit, a D unit and an $RSiO_{1.5}$ unit (hereinafter referred to as a T unit) to the reaction mixture obtained to effect equilibration again [cf. Japanese Pre-examination Patent Publication (KOKAI) No. 58-007452 (1983)].

According to the above process, it is necessary to produce in advance the hydrolysis product containing the T unit for forming a branch. This hydrolysis product is normally produced from chlorosilanes and alkoxysilanes, and the product requires a long water-washing step for removing a generated hydrochloric acid; thus the process is economically disadvantageous. Furthermore, raw materials serving as sources providing an M-, D- or T unit are charged in a reactor in a ratio so designed as to produce a branched organopolysiloxane with desired properties. However, the ratio of units in the resultant hydrolysis product is not necessarily consistent with that as originally designed, and its viscosity are unstable; specifically, for example, lot-to-lot variations in content of each unit or viscosity may be wide. Therefore, in the above process it has been difficult to produce a branched organopolysiloxane in large quantities.

SUMMARY OF THE INVENTION

Thus, an object of the present invention is to provide a production process which is possible to stably produce a branched organopolysiloxane having a constant composition and viscosity.

The present invention provides a process for producing a branched organopolysiloxane, comprising the steps of:

subjecting a mixture of (A) a trialkoxysilane having the following general formula (1):

$$R^1Si(OR^2)_3 \quad (1)$$

wherein $R^1$ is an unsubstituted or substituted monovalent hydrocarbon group, and $R^2$ may be the same or different and are each an unsubstituted or substituted monovalent hydrocarbon group, and (B) an organosiloxane oligomer obtained by hydrolysis-condensation of a silane compound having the following general formula (2):

$$R^3{}_a SiCl_{4-a} \quad (2)$$

wherein $R^3$ may be the same or different and are each an unsubstituted or substituted monovalent group and a is an integer of 2 or 3, to equilibration reaction in the presence of an alkali catalyst, thereby producing an organopolysiloxane, and adding water, subsequently to or concurrently with the equilibration reaction, to the reaction mixture, thereby hydrolyzing the Si—$OR^2$ groups contained in the organopolysiloxane produced above.

According to the present invention, both (A) the alkoxysilane of the general formula (1) used as a source for the T unit and (B) the organosiloxane oligomer used as a source for the M and D units of high purity can be produced or is available without difficulty. Furthermore, according to the present invention, since the hydrolyzable Si—$OR^2$ groups derived from the alkoxysilane of the general formula (1) are removed by the treatment with water, there occurs no change in molecular structure or viscosity, which might be caused by the hydrolyzable groups. Accordingly, it is possible to realize the molecular composition, structure, viscosity, etc. as designed, and the resultant branched organopolysiloxane has high stability. Therefore, for example, lot-to-lot variations in viscosity or other properties can be effectively reduced.

Furthermore, the branched organopolysiloxane obtained according to the present invention has a good correlation between its molecular composition and its viscosity.

DESCRIPTION OF PREFERRED EMBODIMENTS (A) Trialkoxysilane

The trialkoxysilane used as the T unit source for formation of a branch is represented by the above general formula (1).

In the general formula (1), the monovalent hydrocarbon group $R^1$ may be, for example, an alkyl group such as methyl, ethyl and propyl; a cycloalkyl group such as cyclohexyl; and an alkenyl group such as viny, allyl and propenyl; an aryl group such as phenyl; a corresponding subsitututed group in which at least a part of the hydrogen atoms of the above-mentioned hydrocarbon groups are substituted by a halogen atom or the like, e.g., a halogenated alkyl group such as trifluoropropyl; or the like. In view of good heat stability, $R^1$ is preferably a methyl group, a phenyl group or a trifluoropropyl group.

Further, the monovalent hydrocarbon group $R^2$ may be the same group as exemplified for the above $R^1$. Preferably, the $R^2$ are each an alkyl or alkenyl group having 1 to 7 carbon atoms.

(B) Organosiloxane Oligomer

The organosiloxane oligomer which is subjected to the equilibration reaction along with the trialkoxysilane, is obtained by hydrolysis-condensation of the silane compound expressed by the general formula (2), and is well-known to persons skilled in the art. The silane compound of the general formula (2) can be used singly or in combination of two or more kinds.

In the general formula (2), the monovalent hydrocarbon group $R^3$ includes, for example, the groups as exemplified for the above $R^1$. In view of economy and chemical stability of resultant organopolysiloxanes, it is preferably a methyl group. Where cold resistance is required, the silane compound of the general formula (2) preferably contains both a methyl group and a phenyl group as $R^3$; alternatively as the compound of the general formula (2) a compound having only a methyl group as $R^3$ and one having only a phenyl group as $R^3$ are used in combination. Furthermore, where solvent resistance is required, it is preferable to use a silane compound of the general formula (2) containing a trifluoropropyl group.

The structure of the organosiloxane oligomer may be cyclic or linear. The cyclic ones preferably have a degree of polymerization (corresponding to the number of silicon atoms in the molecule) of about 3 to about 7 in view of availability. The linear ones preferably have a degree of polymerization of about 5 to about 500 in view of easy handling. Typical examples of the organosiloxane oligomer are shown below:

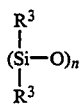  (3)

wherein $R^3$ are as defined above and n is an integer of at least 3,

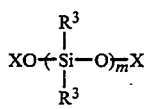  (4)

wherein $R^3$ are as defined above, m is an integer of at least 1 and X are each a hydrogen atom, a methyl group or a trimethylsilyl group, and

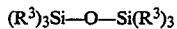  (5)

wherein $R^3$ are as defined above.

As a source for the M unit and the D unit, is used the organosiloxane oligomer which is a hydrolysis-condensation product of the silane compound expressed by the general formula (2). The hydrolysis-condensation product for an M-unit source is obtained as a disiloxane having the formula (5) by hydrolysis of a mono-functional monochlorosilane represented by the general formula (2) wherein a is 3, accompanied by condensation of silanol group.

The hydrolysis-condensation product as a source for D unit is obtained as a cyclosiloxane oligomer having the formula (3) by hydrolysis of a difunctional dichlorosilane having the general formula (2) wherein a is 2, accompanied by condensation of silanol groups. When the hydrolysis is carried out, an alcohol such as methanol may be added together with water, whereupon a product having the formula (4) wherein X is methyl is produced. Both the disiloxane and cyclosiloxane oligomer are obtained in high purity by distillation, and therefore contain no residual hydrochloric acid therein.

Alkaline Catalyst

The alkaline catalyst is used as a catalyst for equilibration reaction of the trialkoxysilane (A) and the organosiloxane oligomer (B), and is known as an equilibration catalyst for siloxane. As a specific example, the catalyst includes an alkali metal hydroxide such as potassium hydroxide and sodium hydroxide, tetraalkylphosphonium hydroxide, tetraalkylammonium hydroxide, and silanolates thereof.

The alkaline catalyst is used in an amount enough to cause the equilibration reaction. Specifically, the amount may be normally about 0.0001 to 1%, preferably 0.001 to 0.1%, based on the total amount of (A) and (B).

Equilibration Reaction

According to the present invention, the trialkoxysilane (A) and the organosiloxane oligomer (B) are firstly subjected to the equilibration reaction in the presence of the above-described alkaline catalyst. Cleavage and recombination of siloxane bonds thereby proceed, resulting in that an organosiloxane having a T unit ($R^1SiO_{1.5}$ unit) derived from the trialkoxysilane is produced.

The equilibration reaction is carried out generally at 50° to 250° C., and particularly at 150° to 200° C. Care should be taken, because if the reaction temperature is too high, there is a fear of decomposition of the polysiloxane produced or organic groups bonded to Si atoms in the siloxane. The equilibration reaction is carried out, for example, by adding the alkali catalyst to a mixture of (A) and (B) kept at a temperature above-described. The amounts of (A) and (B) subjected to the equilibration reaction should be suitably decided depending on the molecular structure of the branched organopolysiloxane intended. For example, when it is intended to produce an organopolysiloxane having a large number of branches, the trialkoxysilane (A) may be used in a larger quantity.

Treatment with Water

According to the present invention, concurrently with or subsequently to the equilibration reaction, the resulting reaction mixture is brought into contact with water.

The organopolysiloxane, that is, the reaction product of the equilibration reaction, contains an $SiOR^2$ group, derived from the trialkoxysilane (A), in a part of the molecule. Since this group is hydrolyzable, it may be converted into a silanol group, which may further condense to form a new siloxane bond. Consequently, the reaction product of the equilibration reaction is liable to vary in properties such as viscosity because of the hydrolyzable group, and may have a wide lot-to-lot variation in viscosity.

According to the present invention, however, the reaction mixture is treated with water, so that the $SiOR^2$ group is hydrolyzed to form a silanol group (SiOH) and concurrently forms a byproduct $R^2OH$ or a ketone as a result of keto-enol conversion of $R^2OH$. The organopolysiloxane thus obtained has no hydrolyzable groups and is therefore a branched organopolysiloxane being stable in properties such as viscosity.

In the above treatment with water, the water may be used in a state of steam or liquid. As a method of bringing the reaction product into contact with water, there may be, for example, a method in which steam is blown into a reactor, a method in which water is added thereto or the like.

Since the byproduct formed by the treatment is volatile, it is separated together with steam from the reaction system when steam is used. When liquid water is used, the byproduct is separated with steam generated by heating. Organopolysiloxane with a low molecular weight in the product is also volatilized together with the byproduct. The low-molecular weight organopolysiloxane may be removed together with the byproduct. Alternatively, the siloxane only may be returned to the reactor again by means of a suitable reflux system. Generally, it is advantageous to return the siloxane only to the reactor again in order to improve the yield of the intended branched organopolysiloxane and to keep the ratio of units as originally charged in the reactor unchanged.

In the present invention, the total quantity of water for use in the treatment with water is set so that the hydrolyzable group in the organopolysiloxane may be fully hydrolyzed. This setting of a necessary amount of water can be made suitably and easily by experiments.

Depending on the introduction rate of water into the reactor, the removal rate of the byproduct is decided. For example, the higher the introduction rate of water is, the higher the removal rate of the byproduct will be. In the case where it is necessary to control the removal rate of the byproduct in order to facilitate separation of the volatilized byproduct from steam, it is effective to add a silane compound of the component (A) dropwise to the reaction mixture concurrently with addition of water. The same effect is obtained by adding a part of the reaction product obtained from the above-described equilibration of (A) and (B), dropwise to the reactor.

At the stage where separation of the byproduct produced by the treatment with water has been finished, the resulting organopolysiloxane contains silanol groups (SiOH). If it is unnecessary to remove the silanol groups, neutralization of the alkali catalyst may be done at this stage. If it is necessary to remove the silanol groups, the silanol groups may be silylated with a silylation agent such as a trialkylchlorosilane. Since the silanol groups are present subjected in equilibrium reaction as shown by the following formula:

$$SiOH + HOSi \rightleftharpoons Si-O-Si + H_2O$$

in the presence of the alkali catalyst, it is possible to reduce the amount of the silanol group by removing water, that is, the byproduct of condensation, to shift the equilibrium reaction toward right side. To remove the water, for example, may be used a method in which pressure in a reactor is controlled, a method in which an inert gas is passed through the reaction solution, a method in which a dehydrating agent is added to reactor, etc., as disclosed in Japanese Pre-examination Patent Publication (KOKAI) No. 3-185026 (1991) and the like.

EXAMPLES

In the following examples, viscosity is given in values measured at 25° C.

EXAMPLES 1 TO 6

A one-liter reactor was charged with a cyclodimethylsiloxane oligomer mixture, hexamethyldisiloxane and trimethoxymethylsilane according to Table 1, respectively. After being heated up to 150° C., the resultant mixture was added with 0.04 g of potassium hydroxide and kept at 150° C. for 4 hours. Afterwards, while the reaction mixture was kept at 150° C. and steam was flowed at a rate of 2 g/hr into the reactor, methanol, steam and low-molecular weight siloxanes volatilized were introduced to a reflux line, among which only the low molecular weight siloxane was returned to the reactor.

After 2 hours, the inflow of steam into the reactor was stopped, and nitrogen was flowed at a rate of 50 cc/min for 2 hours into the reactor. In the meantime, methanol, steam and low-molecular weight siloxanes volatilized were introduced into the reflux line as well, among which only the low-molecular weight siloxane was returned to the reactor.

Then, to the reaction mixture was added 1 g of trimethylchlorosilane at a temperature of 150° C., and after agitation for 1 hour low-boiling point fractions were distilled out by heating under a reduced pressure. By cooling and filtration, a branched dimethylpolysiloxane was obtained. Contents of T unit and M unit forming a terminal end, viscosity and chlorine content thereof are given in Table 1.

Notes: in Examples 3 and 4, quite the same experiment was repeated.

TABLE 1

| Example No. | 1 | 2 | 3 | 4 | 5 | 6 |
| --- | --- | --- | --- | --- | --- | --- |
| Siloxane oligomer (g) | 467.20 | 466.47 | 465.76 | 465.76 | 465.03 | 464.31 |
| Hexamethyldisiloxane (g) | 7.90 | 8.69 | 9.49 | 9.49 | 10.27 | 11.07 |
| Trimethoxymethylsilane (g) | 13.26 | 13.26 | 13.26 | 13.26 | 13.26 | 13.26 |
| T unit (mol %) | 1.50 | 1.50 | 1.50 | 1.50 | 1.50 | 1.50 |
| M unit (mol %) | 1.50 | 1.65 | 1.80 | 1.80 | 1.95 | 2.10 |
| Viscosity (cSt) | 2520 | 1650 | 1100 | 1100 | 700 | 600 |
| Cl content (ppm) | not more than 5 | not more than 5 | not more than 5 | not more than 5 | not more than 5 | not more than 5 |
| Methoxy group content (ppm) | not more than 5 | not more than 5 | not more than 5 | not more than 5 | not more than 5 | not more than 5 |
| Silanol group content (ppm) | not more than 40 | not more than 40 | not more than 40 | not more than 40 | not more than 40 | not more than 40 |

EXAMPLES 7

In the same manner a in Examples 3 and 4 except that 20.86 g of triisopropenoxymethylsilane was used in place of trimethoxymethylsilane, a branched dimethylpolysiloxane was prepared. The amount of each raw material charged, viscosity of the resultant polysiloxane, etc., are given in Table 2.

TABLE 2

| Example No. | 7 |
| --- | --- |
| Siloxane oligomer (g) | 465.76 g |
| Hexamethyldisiloxane (g) | 9.49 g |
| Triisopropenoxymethylsilane (g) | 20.86 g |
| T unit (mol %) | 1.50 |
| M unit (mol %) | 1.80 |
| Viscosity (cSt) | 1100 |
| Cl content (ppm) | not more than 5 |
| Methoxy group content (ppm) | not more than 5 |
| Silanol group content (ppm) | not more than 40 |

COMPARATIVE EXAMPLE 1

224.6 g methyltrichlorosilane and 1291.0 g of dimethyldichlorosilane were mixed, and the resultant mixture was added dropwise to 5,000 g of water to perform hydrolysis accompanied by condensation. The mixture thus obtained by the hydrolysis was washed eight times with water to be neutralized, and thus a hydrolysis-condensation product (I) was obtained. Further, in the same manner as above, a hydrolysis product (II) was obtained.

Subsequently, each of the hydrolysis products (I) and (II) were subjected to the following experiment.

A reactor was charged with 55.94 g of a hydrolysis product mentioned above, 434.36 g of a cyclodimethylsiloxane oligomer mixture and 9.70 g of hexamethyldisiloxane. The resultant mixture was heated up to 150° C. and then 0.04 g of potassium hydroxide was added thereto. However, since an equilibration reaction did not start, the amount of potassium hydroxide was gradually increased to 0.12 g in total until reaction was confirmed to have started. The temperature was kept at 150° C. for 8 hours.

Next, 1 g of trimethylchlorosilane was added to the reaction mixture, which was then stirred for 1 hour. After that, low-boiling point fractions were distilled out by heating under a reduced pressure. By cooling and filtration, a branched dimethylpolysiloxane was obtained, which was then tested for viscosity, chlorine content and silanol group content.

The results obtained for the hydrolysis products (I) and (II) are given in Table 3.

TABLE 3

|  | Comparative Example 1 | |
| --- | --- | --- |
|  | (I) | (II) |
| Hydrolysis-condensation product | | |
| Viscosity (cSt) | 1800 | 860 |
| Cl content (ppm) | not more than 5 | not more than 5 |
| Silanol group content (ppm) | 400 | 550 |

We claim:

1. A process for producing a branched organopolysiloxane, comprising the steps of:

subjecting a mixture of (A) a trialkoxysilane having the following general formula (1):

$$R^1Si(OR^2)_3 \quad (1)$$

wherein $R^1$ is an unsubstituted or substituted monovalent hydrocarbon group, and $R^2$ may be the same or different and are each an unsubstituted or substituted monovalent hydrocarbon group, and (B) an organosiloxane oligomer obtained by hydrolysis-condensation of a silane compound having the following general formula (2):

$$R^3{}_aSiCl_{4-a} \quad (2)$$

wherein $R^3$ may be the same or different and are each an unsubstituted or substituted monovalent hydrocarbon group and a is an integer of 2 or 3, to equilibration reaction at a temperature of 50°–250° C. in the presence of an alkaline catalyst, thereby producing an organopolysiloxane, and adding water, subsequently to or concurrently with the equilibration reaction, to the reaction mixture, in an amount sufficient to hydrolyze all of the Si—$OR^2$ groups contained in the organopolysiloxane produced above.

2. The process of claim 1, wherein in the general formula (1) $R^1$ is an alkyl group, alkenyl group, aryl group or a corresponding substituted group in which a part of the hydrogen atoms of the above-mentioned groups are substituted by a halogen atom, and $R^2$ are each an alkyl group or alkenyl group containing 1 to 7 carbon atoms.

3. The process of claim 1, wherein in the general formula (2) $R^3$ are each an alkyl group or alkenyl group containing 1 to 7 carbon atoms.

4. The process of claim 1, wherein in the general formula (2) $R^3$ are each a methyl group, a phenyl group or a trifluoropropyl group.

5. The process of claim 1, wherein said organosiloxane oligomer is selected from the group consisting of a cyclic organosiloxane oligomer having the formula:

$$\begin{array}{c} R^3 \\ | \\ (Si-O)_n \\ | \\ R^3 \end{array}$$

wherein $R^3$ is as defined above and n is an integer of at least 3, a linear organosiloxane oligomer having the formula:

$$XO{+}\!\!\begin{array}{c}R^3\\|\\Si-O\\|\\R^3\end{array}\!\!{\overline{)_m}}X$$

wherein $R^3$ is as defined above, X may be the same or different and are each a hydrogen atom, a methyl group or a trimethylsilyl group, and m is an integer of at least 1, and a hexaorganodisiloxane having the formula:

$$R^3{}_3Si-O-SiR^3{}_3.$$

6. The process of claim 1, wherein said alkaline catalyst is selected from the group consisting of potassium hydroxide, sodium hydroxide, tetraalkylphosphonium hydroxide, tetraalkylammonium hydroxide and a silanolate thereof.

7. The process of claim 1, comprising concurrently adding an additional amount of a trialkoxysilane of the formula $R_1SiO(OR^2)_3$ with the water.

8. The process of claim 1, comprising concurrently adding an organopolysiloxane produced by equilibration reaction of components (A) and (B) carried out again from said equilibration reaction with the water.

9. The process of claim 1, wherein the water to be added is in a state of liquid or steam.

* * * * *